US012566897B2

(12) United States Patent
Zhu et al.

(10) Patent No.: US 12,566,897 B2
(45) Date of Patent: Mar. 3, 2026

(54) ANTI-TAMPER CIRCUIT, LED CABINET AND LED DISPLAY SCREEN

(71) Applicant: SHENZHEN TIME WAYING TECHNOLOGY CO., LTD., Shenzhen (CN)

(72) Inventors: Qiang Zhu, Shenzhen (CN); Wingyip Kenny Chow, Shenzhen (CN)

(73) Assignee: SHENZHEN TIME WAYING TECHNOLOGY CO., LTD., Shenzhen (CN)

( * ) Notice: Subject to any disclaimer, the term of this patent is extended or adjusted under 35 U.S.C. 154(b) by 371 days.

(21) Appl. No.: 18/368,012

(22) Filed: Sep. 13, 2023

(65) Prior Publication Data

US 2024/0005047 A1     Jan. 4, 2024

Related U.S. Application Data

(63) Continuation of application No. PCT/CN2022/079392, filed on Mar. 4, 2022.

(30) Foreign Application Priority Data

Apr. 1, 2021     (CN) .......................... 202120674547.5

(51) Int. Cl.
$G06F\ 21/86$          (2013.01)
$G06F\ 21/10$          (2013.01)
$G09G\ 3/32$           (2016.01)

(52) U.S. Cl.
CPC .............. *G06F 21/86* (2013.01); *G06F 21/10* (2013.01); *G09G 3/32* (2013.01); *G09G 2358/00* (2013.01); *G09G 2370/022* (2013.01)

(58) Field of Classification Search
CPC ........... G06F 21/86; G06F 21/10; G09G 3/32; G09G 2358/00; G09G 2370/022
See application file for complete search history.

(56) References Cited

U.S. PATENT DOCUMENTS

2020/0074123 A1*   3/2020   Meiler .................... G06F 21/81

* cited by examiner

*Primary Examiner* — Joseph L Greene

(57)          ABSTRACT

The present application provides an anti-tamper circuit, an LED cabinet and an LED display screen, wherein the anti-tamper circuit is applied to an LED display system that includes an LED display screen and a digital cinema playback server connected to the LED display screen. The LED display screen includes a plurality of LED modules. The anti-tamper circuit includes a first signal transmission unit, a second signal transmission unit, a first field-effect transistor, a second field-effect transistor, a charging and discharging unit and a connection port for connecting the digital cinema playback server. In the present application, during power-off, both the anti-tamper circuit and the digital cinema playback server can be ensured to work normally; thus, digital copyrights are not subject to security threats, and the security of information is greatly improved.

19 Claims, 2 Drawing Sheets

ANTI-TAMPER CIRCUIT, LED CABINET AND LED DISPLAY SCREEN

CROSS-REFERENCE TO RELATED APPLICATIONS

This application is a Continuation Applications of PCT Application No. PCT/CN2022/079392, filed Mar. 4, 2022, which claims the priority of Chinese patent application No. 202120674547.5, entitled "ANTI-TAMPER CIRCUIT, LED CABINET, AND LED DISPLAY SCREEN" and submitted to the State Intellectual Property Office of P.R.C. on Apr. 1, 2021, the entire contents of which are hereby incorporated by reference.

TECHNICAL FIELD

The present application relates to the technical field of display, in particular to an anti-tamper circuit, an LED cabinet with the anti-tamper circuit, and an LED display screen with the LED cabinet.

BACKGROUND

Light emitting diode display (LED display) is a flat-panel display composed of a plurality of LED modules, configured to display various information such as text, images, videos and etc. The LED display integrates microelectronics technology, computer technology and information processing technology, and has the advantages of bright colors, wide dynamic range, high brightness, long life, stable and reliable work, etc., so it is widely used in the field of commercial media, cultural performances, sports venues, information dissemination, news release, securities trading and etc., and can meet the needs of different environments.

In the prior art, the LED displays are generally divided into pre maintenance LED displays and post maintenance LED displays according to maintenance manners. Compared with the post maintenance LED displays, the pre maintenance LED displays have a thinner overall thickness and stronger space saving ability, and are more convenient and efficient for disassembly of the LED modules, so that they are suitable for indoor scenes. The pre maintenance LED displays are usually equipped with anti-tamper circuits for monitoring the connection status of the LED modules, so as to protect digital copyrights. However, such anti-tamper circuit cannot continuously monitor the connection status of the LED modules when the power is off, making the digital copyrights subject to significant security threats.

Therefore, it is necessary to improve the structure of the above-mentioned anti-tamper circuit.

SUMMARY

According to the embodiments of the present application, an anti-tamper circuit, an LED cabinet and an LED display screen are provided.

An anti-tamper circuit applied to an LED display system including an LED display screen and a digital cinema playback server connected to the LED display screen, the LED display screen including a plurality of LED modules, wherein the anti-tamper circuit includes a first signal transmission unit, a second signal transmission unit, a first field-effect transistor, a second field-effect transistor, a charging and discharging unit and a connection port for connecting the digital cinema playback server, the first signal transmission unit and the second signal transmission unit being jointly connected to a first point of common coupling; a drain of the first field-effect transistor and a gate of the second field-effect transistor being jointly connected to a second point of common coupling; the second point of common coupling and the gate of the second field-effect transistor being jointly connected to a third point of common coupling; the third point of common coupling being connected to the first point of common coupling; a drain of the second field-effect transistor and the connection port PC being jointly connected to a fourth point of common coupling; a gate of the first field-effect transistor and the plurality of LED modules set in parallel being jointly connected to a fifth point of common coupling; the second point of common coupling, the fourth point of common coupling and the fifth point of common coupling being jointly connected to the charging and discharging unit; a source of the second field-effect transistor and the connection port being jointly connected to a sixth point of common coupling; and the sixth point of common coupling, the third point of common coupling, the fifth point of common coupling and a source of the first field-effect transistor being jointly connected to the ground.

In some embodiments, the charging and discharging unit includes a power supply, a first resistor, a second resistor, a first capacitor, a second capacitor and a diode, one end of the first capacitor and one end of the second capacitor are jointly connected to a seventh point of common coupling which is configured for grounding; another end of the first capacitor is connected to one end of the first resistor; another end of the second capacitor is connected to one end of the second resistor; the another end of the first resistor and the another end of the second resistor are jointly connected to an eighth point of common coupling; the eighth point of common coupling is connected to a cathode of the diode; an anode of the diode is connected to the power supply; the eighth point of common coupling and the another end of the first resistor are jointly connected to a ninth point of common coupling; and the second point of common coupling, the fourth point of common coupling, and the fifth point of common coupling are jointly connected to the ninth point of common coupling.

In some embodiments, the anti-tamper circuit further includes a third resistor, a fourth resistor, a fifth resistor, a sixth resistor and a seventh resistor, the third resistor being connected between the fifth point of common coupling and the ninth point of common coupling; the fourth resistor being connected between the fifth point of common coupling and the ground; the fifth resistor being connected between the second point of common coupling and the ninth point of common coupling; the sixth resistor being connected between the third point of common coupling and the ground, and the seventh resistor being connected between the fourth point of common coupling and the ninth point of common coupling.

In some embodiments, the first signal transmission unit includes a first transmission port and a second transmission port, each of which including a first pin, a second pin, a third pin and a fourth pin, the first pin and the second pin of the first transmission port are jointly connected to a tenth point of common coupling; the third pin and the fourth pin of the first transmission port are jointly connected to an eleventh point of common coupling; the first pin and the second pin of the second transmission port are jointly connected to a twelfth point of common coupling, the third pin and the fourth pin of the second transmission port are jointly connected to a thirteenth point of common coupling which is configured for grounding; and the eleventh point of common coupling is connected to the thirteenth point of common coupling;

the second signal transmission unit includes a third transmission port and a fourth transmission port, each of which includes a fifth pin, a sixth pin, a seventh pin and an eighth pin, the fifth pin and the sixth pin of the third transmission port are jointly connected to a fourteenth point of common coupling; the seventh pin and the eighth pin of the third transmission port are jointly connected to a fifteenth point of common coupling; the fifth pin and the sixth pin of the fourth transmission port are jointly connected to a sixteenth point of common coupling; the seventh pin and the eighth pin of the fourth transmission port are jointly connected to a seventeenth point of common coupling which is configured for grounding; and the fifteenth point of common coupling is connected to the seventeenth point of common coupling;

the tenth point of common coupling and the fourteenth point of common coupling are jointly connected to an eighteenth point of common coupling, the twelfth point of common coupling and the sixteenth point of common coupling are jointly connected to the first point of common coupling; and the eighteenth point of common coupling is connected to the first point of common coupling.

In some embodiments, the first signal transmission unit further includes an eighth resistor connected between the thirteenth point of common coupling and the ground.

In some embodiments, the second signal transmission unit further includes a ninth resistor connected between the seventeenth point of common coupling and the ground.

In some embodiments, further including a tenth resistor connected between the first point of common coupling and the third point of common coupling.

In some embodiments, the connection port includes a ninth pin and a tenth pin, the ninth pin is connected to the fourth point of common coupling, and the tenth pin is connected to the sixth point of common coupling.

In some embodiments, the first and second field-effect transistors both are NMOS transistors.

An LED cabinet includes a circuit board integrated with an anti-tamper circuit as described above, n LED modules, n first connectors and n second connectors matched with the first connectors, the n second connectors being provided on the n LED modules, respectively, and the n first connectors which are connected in parallel and the gate of the first field-effect transistor being jointly connected to the fifth point of common coupling, and the n first connectors being connected to the n second connectors correspondingly, wherein n is a positive integer greater than 1.

An LED display module includes an LED cabinet as described above.

From the above description, it can be seen that compared to the related art, the present application has the following beneficial effects:

The connection or disconnection between the LED modules and the gate of the first field-effect transistor generates corresponding changes in high and low electrical levels, and signals generated by the changes in high and low electrical levels are transmitted through the first signal transmission unit and the second signal transmission unit to the connection port which is connected to the digital cinema playback server, causing the digital cinema playback server to switch between normal and stopped working states based on the transmitted signals. During this process, if the power supply continues, the charging and discharging unit is in a charging state until fully charged; and if the power supply is cut off, the charging and discharging unit is in a discharge state, which can supply power to the anti-tamper circuit to ensure its normal anti-tamper operation. At the same time, since the digital cinema playback server can use the internal power supply to ensure normal operation, both the anti-tamper circuit and the digital cinema playback server can be ensured to work normally during power off, and thus digital copyrights are not subject to security threats, and the security of information is greatly improved.

DESCRIPTION OF THE DRAWINGS

In order to more effectively demonstrate the technical solutions in the embodiments or prior art of the present application, the accompanying drawings that must be utilized in the description of the embodiments or prior art are briefly described below. It will be apparent that the accompanying drawings in the following description are only some, but not all, embodiments of the present application. For those of ordinary skill in the art, other drawings may be obtained from the provided accompanying drawings without creative labor.

DESCRIPTION OF THE EMBODIMENTS

In order to make the objects, technical solutions, and advantages of the present application clearer, it will be further described in details with reference to the drawings and embodiments. The same or similar labels throughout represent the same or similar components or components with the same or similar functions. It should be understood that the specific embodiments described here are only used to explain the present application and are not intended to limit the present application. In addition, the technical features involved in the embodiments of the present application described below may be combined with each other as long as they do not conflict with each other.

Figure 1:
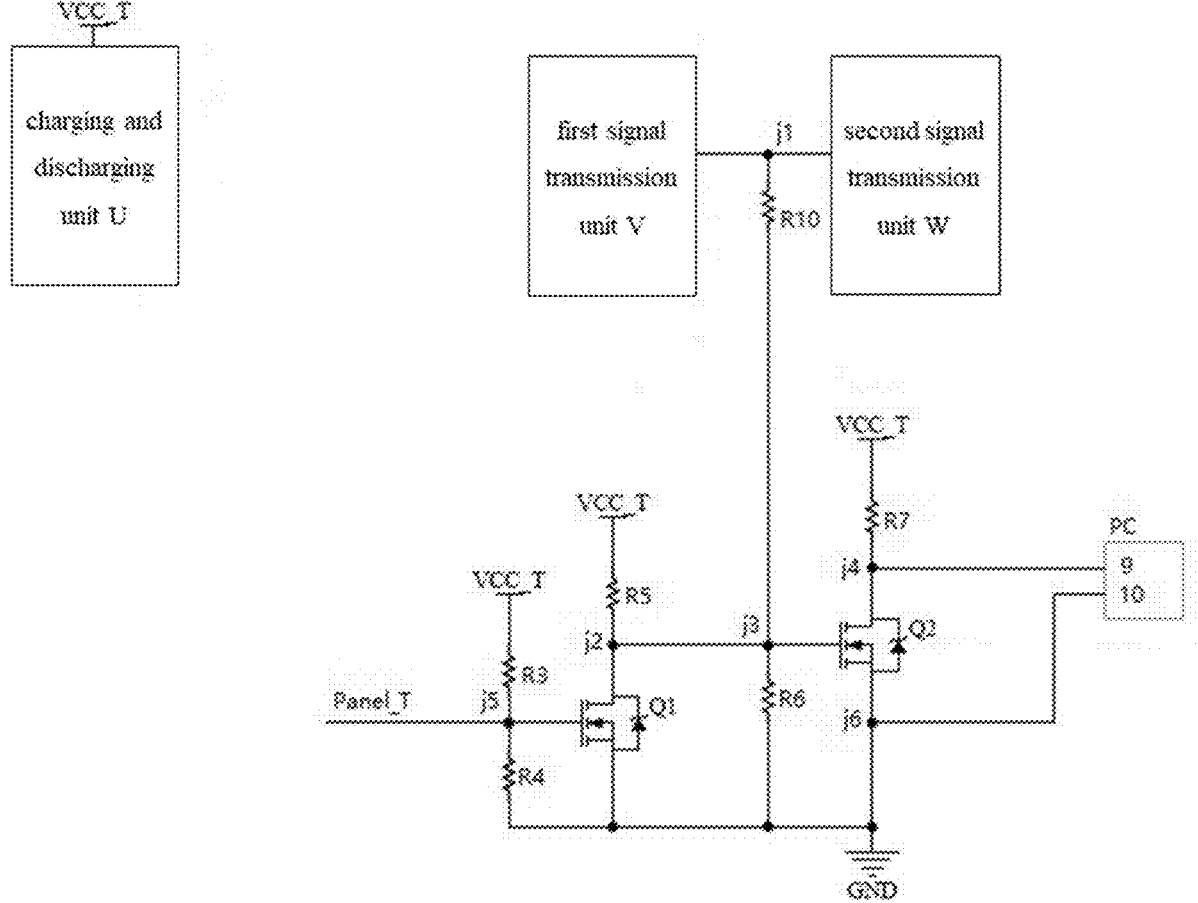
FIG. 1 is a schematic, structural diagram of an anti-tamper circuit provided by an embodiment of the present application.

Please refer to FIG. 1, which is a schematic, structural diagram of an anti-tamper circuit provided by an embodiment of the present application.

As shown in FIG. 1, an embodiment of the present application provides an anti-tamper circuit applied to an LED display system. The LED display system includes an LED display screen and a digital cinema playback server connected to the LED display screen. The LED display screen includes a plurality of LED modules. The anti-tamper circuit includes a first signal transmission unit V, a second signal transmission unit W, a first field-effect transistor (FET) Q1, a second FET Q2, a charging and discharging unit U and a connection port PC configured for connecting the digital cinema playback server. The first signal transmission unit V and the second signal transmission unit W are jointly connected to a first point of common coupling (PCC) j1; a drain of the first FET Q1 and a gate of the second FET Q2 are jointly connected to a second PCC j2; the second PCC j2 and the gate of the second FET Q2 are jointly connected to a third PCC j3; the third PCC j3 is connected to the first PCC j1; a drain of the second FET Q2 and the connection port PC are jointly connected to a fourth PCC j4; a gate of the first FET Q1 and the LED modules which are set in parallel are jointly connected to a fifth PCC j5; the second PCC j2, the fourth PCC j4 and the fifth PCC j5 are jointly connected to the charging and discharging unit U; a source of the second FET Q2 and the connection port PC are jointly connected to a sixth PCC j6; and the sixth PCC j6, the third PCC j3, the fifth PCC j5 and a source of the first FET Q1 are grounded together.

Preferably, the first FET Q1 and the second FET Q2 both are NMOS (Negative Channel Metal Oxide Semiconductor) transistors. Of course, the first FET Q1 and the second FET Q2 adopted in the embodiments of the present application are not limited to such type. In other embodiments, the first FET Q1 and the second FET Q2 may be other types of FETs, such as PMOS (Positive Channel Metal Oxide Semiconductor) transistors, which are determined based on actual application scenarios, and the embodiments of the present application do not limit it.

A description to a working process of the anti-tamper circuit provided by an embodiment of the present application is as follows, taking nine LED modules as an example. The nine LED modules are labeled as M1, M2, M3, M4, M5, M6, M7, M8 and M9, respectively.

When the LED module is connected to the gate of the first FET Q1, an electrical level between the LED module and the gate of the first FET Q1 is low; and when the LED module is disconnected from the gate of the first FET Q1, the electrical level between the LED module and the gate of the first FET Q1 is high. In a practical application, when all of the nine LED modules are disconnected from the gate of the first FET Q1, the electrical level between each of the nine LED modules and the gate of the first FET Q1 is high. At this time, a tampering signal will be triggered. The triggered tampering signal will be transmitted to the connection port PC through the first signal transmission unit V or the second signal transmission unit W, wherein the connection port PC will be in a high-impedance state at this time. When the digital cinema playback server receives the tampering signal at the connection port PC, it will drive its internal normally closed port to open, that is, the digital cinema playback server will stop working. When some of the nine LED modules are connected to the gate of the first FET Q1, the electrical levels between the some of the nine LED modules and the gate of the first FET Q1 are low, and the electrical levels between the remaining LED modules and the gate of the first FET Q1 are low. At this time, a non-tampering signal will be triggered. The triggered non-tampering signal is transmitted to the connection port PC through the first signal transmission unit V or the second signal transmission unit W, wherein the connection port PC will be in a conductive state at this time. When the digital cinema playback server receives the non-tampering signal at the connection port PC, it will drive its internal normally closed port to be closed, that is, the digital cinema playback server is working normally. When all of the nine LED modules are connected to the gate of the first FET Q1, all of the electrical levels between the nine LED modules and the gate of the first FET Q1 are low. At this time, a non-tampering signal will be triggered. The triggered non-tampering signal is transmitted to the connection port PC through the first signal transmission unit V or the second signal transmission unit W, wherein the connection port PC will be in a conductive state at this time. When the digital cinema playback server receives the non-tampering signal at the connection port PC, it will drive its internal normally closed port to be closed, that is, the digital cinema playback server is working normally.

For understanding this working process clearly, a working logic diagram below may be referred. In the diagram, "0" indicates that the LED module is connected to the gate of the first FET Q1, "1" indicates that the LED module is disconnected from the gate of the first FET Q1, and "x" indicates that a relationship between the LED module and the gate of the first FET Q1 is either connected or disconnected.

TABLE 1

| M1 | M2 | M3 | M4 | M5 | M6 | M7 | M8 | M9 | PC |
|----|----|----|----|----|----|----|----|----|------|
| 0 | x | x | x | x | x | x | x | x | Normal |
| x | 0 | x | x | x | x | x | x | x | Normal |
| x | x | 0 | x | x | x | x | x | x | Normal |
| x | x | x | 0 | x | x | x | x | x | Normal |
| x | x | x | x | 0 | x | x | x | x | Normal |
| x | x | x | x | x | 0 | x | x | x | Normal |
| x | x | x | x | x | x | 0 | x | x | Normal |
| x | x | x | x | x | x | x | 0 | x | Normal |
| x | x | x | x | x | x | x | x | 0 | Normal |
| 1 | 1 | 1 | 1 | 1 | 1 | 1 | 1 | 1 | Stop |

During this working process, if the power supply continues, the charging and discharging unit U is in a charging state until it is fully charged; and if the power supply is cut off, the charging and discharging unit U is in a discharging state, which can supply power to the above anti-tamper circuit provided by an embodiment of the present application, so as to ensure normal anti-tamper operation of the anti-tamper circuit. At the same time, since the digital cinema playback server can use the internal power supply to ensure normal operation, both the anti-tamper circuit and the digital cinema playback server can be ensured to work normally during power off.

The above anti-tamper circuit provided by an embodiment of the present application can ensure the normal operation of the anti-tamper circuit and the digital cinema playback server, whether in a power on state or a power off state, so that the digital copyrights are not subject to security threats, and the security of information is greatly improved.

Figure 2:
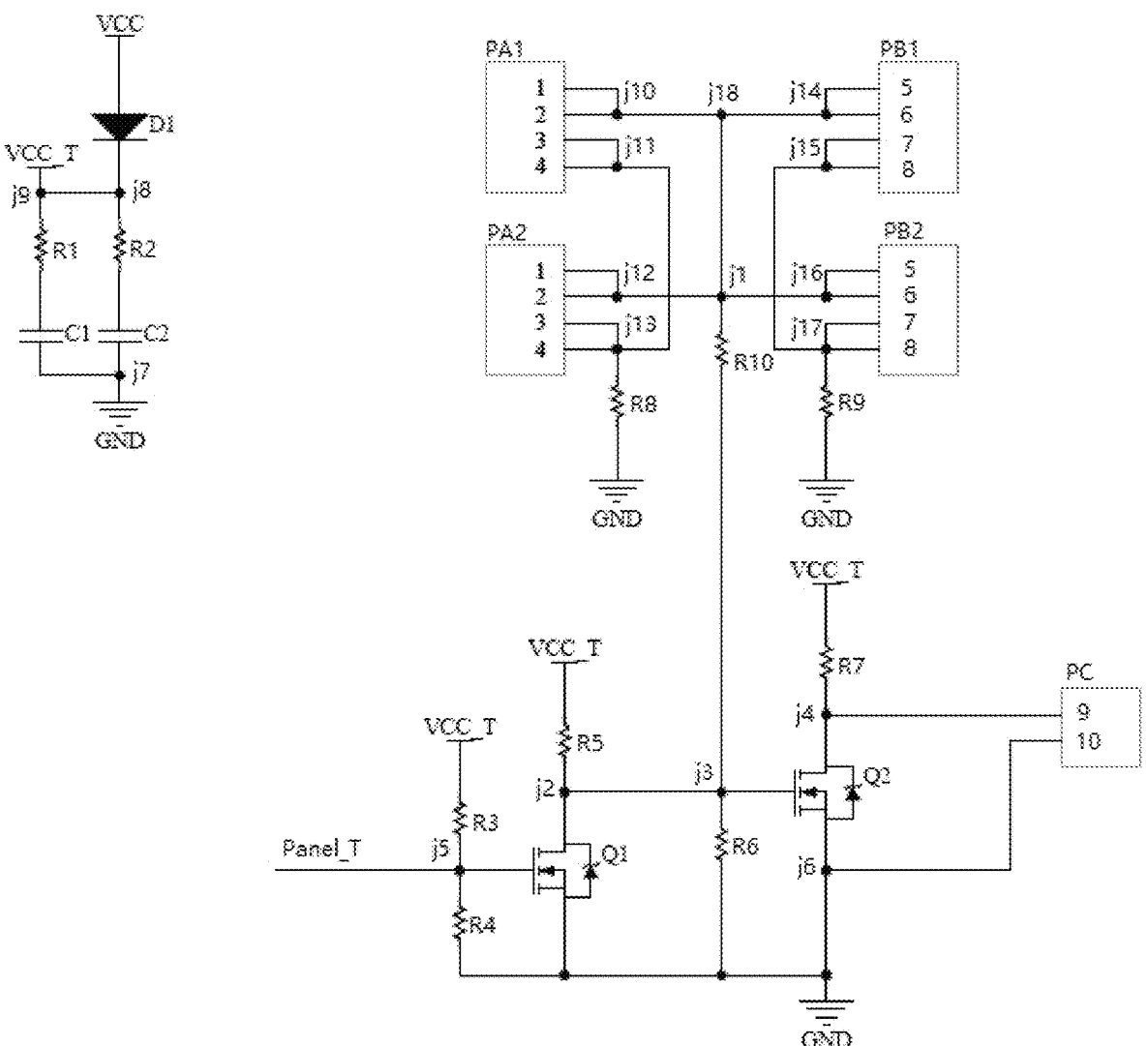
FIG. 2 is another schematic, structural diagram of an anti-tamper circuit provided by an embodiment of the present application.

Please further referring to FIG. 2, which is another schematic, structural diagram of an anti-tamper circuit provided by an embodiment of the present application.

As a practicable embodiment, as shown in FIG. 2, the charging and discharging unit U may include a power supply VCC, a first resistor R1, a second resistor R2, a first capacitor C1, a second capacitor C2 and a diode D1. One end of the first capacitor C1 and one end of the second capacitor C2 may be jointly connected to a seventh PCC j7 which is configured for grounding; another end of the first capacitor C1 may be connected to one end of the first resistor R1; another end of the second capacitor C2 may be connected to one end of the second resistor R2; another end of the first resistor R1 and another end of the second resistor R2 may be jointly connected to an eighth PCC j8; the eighth PCC j8 may be connected to a cathode of the diode D1; an anode of the diode D1 may be connected to the power supply VCC, and the eighth PCC j8 and another end of the first resistor R1 may be jointly connected to a ninth PCC j9. At this time, the second PCC j2, the fourth PCC j4, and the fifth PCC j5 may be jointly connected to the ninth PCC j9.

Furthermore, as shown in FIG. 2, the anti-tamper circuit provided by an embodiment of the present application may further include a third resistor R3, a fourth resistor R4, a fifth resistor R5, a sixth resistor R6 and a seventh resistor R7. The third resistor R3 may be connected between the fifth PCC j5 and the ninth PCC j9, the fourth resistor R4 may be connected between the fifth PCC j5 and the ground, the fifth resistor R5 may be connected between the second PCC j2 and the ninth PCC j9, the sixth resistor R6 may be connected between the third PCC j3 and the ground, and the seventh resistor R7 may be connected between the fourth PCC j4 and the ninth PCC j9.

As a practicable embodiment, as shown in FIG. 2, the first signal transmission unit V may include a first transmission port PA1 and a second transmission port PA2. The first transmission port PA1 and the second transmission port PA2 may both have four pins, namely a first pin 1, a second pin 2, a third pin 3 and a fourth pin 4. The second signal transmission unit W may include a third transmission port PB1 and a fourth transmission port PB2. The third transmission port PB1 and the fourth transmission port PB2 may both have four pins, namely a fifth pin 5, a sixth pin 6, a seventh pin 7 and an eighth pin 8.

Specifically, the first pin 1 and the second pin 2 of the first transmission port PA1 may be jointly connected to a tenth PCC j10, and the third pin 3 and the fourth pin 4 of the first transmission port PA1 may be jointly connected to an eleventh PCC j11. The first pin 1 and the second pin 2 of the second transmission port PA2 may be jointly connected to a twelfth PCC j12, and the third pin 3 and the fourth pin 4 of the second transmission port PA2 may be jointly connected to a thirteenth PCC j13 which is configured for grounding. At this time, the eleventh PCC j11 may be connected to the thirteenth PCC j13. The fifth pin 5 and the sixth pin 6 of the third transmission port PB1 may be jointly connected to a fourteenth PCC j14, and the seventh pin 7 and the eighth pin 8 of the third transmission port PB1 may be jointly connected to a fifteenth PCC j15. The fifth pin 5 and the sixth pin 6 of the fourth transmission port PB2 may be jointly connected to a sixteenth PCC j16, and the seventh pin 7 and the eighth pin 8 of the fourth transmission port PB2 may be jointly connected to a seventeenth PCC j17 which is configured for grounding. At this point, the fifteenth PCC j15 may be connected to the seventeenth PCC j17.

More specifically, the tenth PCC j10 and the fourteenth PCC j14 may be jointly connected to an eighteenth PCC j18, and the twelfth PCC j12 and the sixteenth PCC j16 may be jointly connected to the first PCC j1. In this case, the eighteenth PCC j18 may be connected to the first PCC j1.

Furthermore, as shown in FIG. 2, the first signal transmission unit V may further include an eighth resistor R8 which may be connected between the thirteenth PCC j13 and the ground, and the second signal transmission unit W may further include a ninth resistor R9 which may be connected between the seventeenth PCC j17 and the ground.

Furthermore, the above anti-tamper circuit provided by an embodiment of the present application may further include a tenth resistor R10, which may be connected between the first PCC j1 and the third PCC j3.

As a practicable implementation, as shown in FIG. 2, the connection port PC may include a ninth pin 9 and a tenth pin 10, wherein the ninth pin 9 may be connected to the fourth PCC j4, and the tenth pin 10 may be connected to the sixth PCC j6.

From the above description, it can be seen that the anti-tamper circuit provided by embodiments of the present application includes various types of components, such as capacitors, resistors, FETs, diodes, connection ports, transmission ports and etc. It should be understood that as long as the design concept of the present application is not violated, the number, connection positions, and even the number of pins set in the connection ports and transmission ports of these components may be changed, and the embodiments of the present application do not limit it.

An embodiment of the present application also provides an LED cabinet, which includes a circuit board integrated with the above anti-tamper circuit provided by an embodiment of the present application, n LED modules, n first connectors and n second connectors matched with the first connectors, wherein n is a positive integer greater than 1. The n second connectors are provided on the n LED modules, respectively. At this time, the n first connectors which are connected in parallel firstly and the gate of the first FET Q1 are then jointly connected to the fifth PCC j5, and the n first connectors are connected to the n second connectors correspondingly.

From here, it can be seen that the connection and disconnection between the LED module and the gate of the first FET Q1 as described above is actually the connection and disconnection between the first connector and the second connector.

As a common knowledge in this field, the LED cabinet generally includes a circuit backboard and a HUB board. The circuit board integrated with the above anti-tamper circuit provided by an embodiment of the present application may be either the circuit backboard or the HUB board. When the circuit board integrated with the above anti-tamper circuit provided by an embodiment of the present application is HUB board and there are multiple HUB boards, each of the HUB boards is integrated with the above anti-tamper circuit provided by an embodiment of the present application and corresponds to multiple LED modules, and any one of the HUB boards transmits the tampering signal/non-tampering signal to adjacent HUB boards through the first signal transmission unit V or the second signal transmission unit W of the above anti-tamper circuit provided by an embodiment of the present application which is integrated on this HUB board, wherein the adjacent HUB boards refer to the HUB boards located in the upper, lower, left and right directions of this HUB board as the center. Finally, both the tampering and non-tampering signals will reach the connection port PC, causing the digital cinema playback server to switch between normal and stopped working states. The first signal transmission unit V may be used for signal transmission with the HUB boards located at the upper and lower directions, and the second signal transmission unit W may be used for signal transmission with the HUB boards located at the left and right directions. Of course, the first signal transmission unit V may also be used for signal transmission with the HUB boards located at the left and right directions, and the second signal transmission unit W may also be used for signal transmission with the HUB boards located at the upper and lower directions, and the embodiments of the present application do not limit it.

An embodiment of the present application further provides an LED display screen, which includes a plurality of LED cabinets as described above. Generally, the LED display screen is formed by splicing of a plurality of LED cabinets.

It can be understood that the LED display screen includes m LED cabinets, wherein m is a positive integer greater than 1. Each of the LED cabinets includes n LED modules, and each of the LED modules is integrated with the above anti-tamper circuit. That is, the LED display screen is integrated with a total of m*n anti-tamper circuits. In actual operation, preferably, a judgment is made according to the received signal (i.e. tampering signal or non-tampering signal as described above) transmitted by each of the anti-tamper circuits. When all of the anti-tamper circuits in one of the LED cabinets transmit tampering signals, the digital cinema playback server stops working. Furthermore, the LED cabinet as described above includes a panel for packaging the circuit board, thereby ensuring the safety of the LED modules. That is, if the LED cabinet is damaged due to external factors, all anti-tamper circuits in the LED cabinet will emit tampering signals, which can avoid the occurrence of individual anti-tamper circuit emitting tampering signal due to internal reasons, leading to overall shutdown.

It should be noted that each embodiment in the content of the present invention is described in a progressive manner, with an emphasis on how it differs from the others. And the same and similar parts between each embodiment can be referred to each other.

It should also be noted that in the content of the present invention, relational terms such as first and second are used only to distinguish one object or operation from another, and do not necessarily require or imply any such actual relationship or order between these objects or operations. Moreover, the terms "includes," "comprises," or any other variation thereof are intended to cover non-exclusive inclusion, such that a process, method, article, or apparatus that includes a set of elements includes not only those elements, but also other elements not expressly listed, or elements that are inherent to such a process, method, article, or apparatus. Without further limitation, the elements defined by the statement "including a" do not preclude the existence of additional identical elements in the process, method, article, or apparatus that include the elements.

The foregoing description of the disclosed embodiments enables those skilled in the art to implement or use the contents of the invention. A variety of modifications to these embodiments will be apparent to those skilled in the art, and the general principles defined in the contents of the present invention can be implemented in other embodiments without departing from the spirit or scope of the contents of the present invention. Accordingly, the contents of the present invention will not be limited to those embodiments shown in the contents of the present invention, but will be subject to the widest scope consistent with the principles and novel features disclosed in the contents of the present invention.

What is claimed is:

1. An anti-tamper circuit applied to an LED display system comprising an LED display screen and a digital cinema playback server connected to the LED display screen, the LED display screen comprising a plurality of LED modules, the anti-tamper circuit comprising:
    a first signal transmission unit, a second signal transmission unit, a first field-effect transistor, a second field-effect transistor, a charging and discharging unit and a connection port for connecting the digital cinema playback server,
    the first signal transmission unit and the second signal transmission unit being jointly connected to a first point of common coupling; a drain of the first field-effect transistor and a gate of the second field-effect transistor being jointly connected to a second point of common coupling; the second point of common coupling and the gate of the second field-effect transistor being jointly connected to a third point of common coupling; the third point of common coupling being connected to the first point of common coupling; a drain of the second field-effect transistor and the connection port PC being jointly connected to a fourth point of common coupling; a gate of the first field-effect transistor and the plurality of LED modules set in parallel being jointly connected to a fifth point of common coupling; the second point of common coupling, the fourth point of common coupling and the fifth point of common coupling being jointly connected to the charging and discharging unit; a source of the second field-effect transistor and the connection port being jointly connected to a sixth point of common coupling; and the sixth point of common coupling, the third point of common coupling, the fifth point of common coupling and a source of the first field-effect transistor being jointly connected to the ground.

2. The anti-tamper circuit according to claim 1, wherein the charging and discharging unit comprises a power supply, a first resistor, a second resistor, a first capacitor, a second capacitor and a diode,
    one end of the first capacitor and one end of the second capacitor are jointly connected to a seventh point of common coupling which is configured for grounding; another end of the first capacitor is connected to one end of the first resistor; another end of the second capacitor is connected to one end of the second resistor; the another end of the first resistor and the another end of the second resistor are jointly connected to an eighth point of common coupling; the eighth point of common coupling is connected to a cathode of the diode; an anode of the diode is connected to the power supply; the eighth point of common coupling and the another end of the first resistor are jointly connected to a ninth point of common coupling; and the second point of common coupling, the fourth point of common coupling, and the fifth point of common coupling are jointly connected to the ninth point of common coupling.

3. The anti-tamper circuit according to claim 2, further comprising a third resistor, a fourth resistor, a fifth resistor, a sixth resistor and a seventh resistor,
    the third resistor being connected between the fifth point of common coupling and the ninth point of common coupling; the fourth resistor being connected between the fifth point of common coupling and the ground; the fifth resistor being connected between the second point of common coupling and the ninth point of common coupling; the sixth resistor being connected between the third point of common coupling and the ground, and the seventh resistor being connected between the fourth point of common coupling and the ninth point of common coupling.

4. The anti-tamper circuit according to claim 1, wherein the first signal transmission unit comprises a first transmission port and a second transmission port, each of which comprising a first pin, a second pin, a third pin and a fourth pin,
    the first pin and the second pin of the first transmission port are jointly connected to a tenth point of common coupling; the third pin and the fourth pin of the first transmission port are jointly connected to an eleventh point of common coupling; the first pin and the second pin of the second transmission port are jointly connected to a twelfth point of common coupling, the third pin and the fourth pin of the second transmission port are jointly connected to a thirteenth point of common coupling which is configured for grounding; and the eleventh point of common coupling is connected to the thirteenth point of common coupling;
    the second signal transmission unit comprises a third transmission port and a fourth transmission port, each of which comprises a fifth pin, a sixth pin, a seventh pin and an eighth pin,
    the fifth pin and the sixth pin of the third transmission port are jointly connected to a fourteenth point of common coupling; the seventh pin and the eighth pin of the third transmission port are jointly connected to a fifteenth point of common coupling; the fifth pin and the sixth pin of the fourth transmission port are jointly connected to a sixteenth point of common coupling; the seventh pin and the eighth pin of the fourth transmission port are jointly connected to a seventeenth point of common coupling which is configured for grounding; and the fifteenth point of common coupling is connected to the seventeenth point of common coupling;

the tenth point of common coupling and the fourteenth point of common coupling are jointly connected to an eighteenth point of common coupling, the twelfth point of common coupling and the sixteenth point of common coupling are jointly connected to the first point of common coupling; and the eighteenth point of common coupling is connected to the first point of common coupling.

5. The anti-tamper circuit according to claim 4, wherein the first signal transmission unit further comprises an eighth resistor connected between the thirteenth point of common coupling and the ground.

6. The anti-tamper circuit according to claim 4, wherein the second signal transmission unit further comprises a ninth resistor connected between the seventeenth point of common coupling and the ground.

7. The anti-tamper circuit according to claim 4, further comprising a tenth resistor connected between the first point of common coupling and the third point of common coupling.

8. The anti-tamper circuit according to claim 1, wherein the connection port comprises a ninth pin and a tenth pin, the ninth pin is connected to the fourth point of common coupling, and the tenth pin is connected to the sixth point of common coupling.

9. The anti-tamper circuit according to claim 1, wherein the first and second field-effect transistors both are NMOS transistors.

10. An LED cabinet, comprising a circuit board integrated with an anti-tamper circuit according to claim 1, n LED modules, n first connectors and n second connectors matched with the first connectors, the n second connectors being provided on the n LED modules, respectively, and the n first connectors which are connected in parallel and the gate of the first field-effect transistor being jointly connected to the fifth point of common coupling, and the n first connectors being connected to the n second connectors correspondingly, wherein n is a positive integer greater than 1.

11. An LED display screen, comprising an LED cabinet according to claim 10.

12. The LED cabinet according to claim 10, wherein the charging and discharging unit comprises a power supply, a first resistor, a second resistor, a first capacitor, a second capacitor and a diode, one end of the first capacitor and one end of the second capacitor are jointly connected to a seventh point of common coupling which is configured for grounding; another end of the first capacitor is connected to one end of the first resistor; another end of the second capacitor is connected to one end of the second resistor; the another end of the first resistor and the another end of the second resistor are jointly connected to an eighth point of common coupling; the eighth point of common coupling is connected to a cathode of the diode; an anode of the diode is connected to the power supply; the eighth point of common coupling and the another end of the first resistor are jointly connected to a ninth point of common coupling; and the second point of common coupling, the fourth point of common coupling, and the fifth point of common coupling are jointly connected to the ninth point of common coupling.

13. The LED cabinet according to claim 12, further comprising a third resistor, a fourth resistor, a fifth resistor, a sixth resistor and a seventh resistor, the third resistor being connected between the fifth point of common coupling and the ninth point of common coupling; the fourth resistor being connected between the fifth point of common coupling and the ground; the fifth resistor being connected between the second point of common coupling and the ninth point of common coupling; the sixth resistor being connected between the third point of common coupling and the ground, and the seventh resistor being connected between the fourth point of common coupling and the ninth point of common coupling.

14. The LED cabinet according to claim 10, wherein the first signal transmission unit comprises a first transmission port and a second transmission port, each of which comprising a first pin, a second pin, a third pin and a fourth pin, the first pin and the second pin of the first transmission port are jointly connected to a tenth point of common coupling; the third pin and the fourth pin of the first transmission port are jointly connected to an eleventh point of common coupling; the first pin and the second pin of the second transmission port are jointly connected to a twelfth point of common coupling, the third pin and the fourth pin of the second transmission port are jointly connected to a thirteenth point of common coupling which is configured for grounding; and the eleventh point of common coupling is connected to the thirteenth point of common coupling;

the second signal transmission unit comprises a third transmission port and a fourth transmission port, each of which comprises a fifth pin, a sixth pin, a seventh pin and an eighth pin, the fifth pin and the sixth pin of the third transmission port are jointly connected to a fourteenth point of common coupling; the seventh pin and the eighth pin of the third transmission port are jointly connected to a fifteenth point of common coupling; the fifth pin and the sixth pin of the fourth transmission port are jointly connected to a sixteenth point of common coupling; the seventh pin and the eighth pin of the fourth transmission port are jointly connected to a seventeenth point of common coupling which is configured for grounding; and the fifteenth point of common coupling is connected to the seventeenth point of common coupling;

the tenth point of common coupling and the fourteenth point of common coupling are jointly connected to an eighteenth point of common coupling, the twelfth point of common coupling and the sixteenth point of common coupling are jointly connected to the first point of common coupling; and the eighteenth point of common coupling is connected to the first point of common coupling.

15. The LED cabinet according to claim 14, wherein the first signal transmission unit further comprises an eighth resistor connected between the thirteenth point of common coupling and the ground.

16. The LED cabinet according to claim 14, wherein the second signal transmission unit further comprises a ninth resistor connected between the seventeenth point of common coupling and the ground.

17. The LED cabinet according to claim 14, further comprising a tenth resistor connected between the first point of common coupling and the third point of common coupling.

18. The LED cabinet according to claim 10, wherein the connection port comprises a ninth pin and a tenth pin, the ninth pin is connected to the fourth point of common coupling, and the tenth pin is connected to the sixth point of common coupling.

19. The LED cabinet according to claim 10, wherein the first and second field-effect transistors both are NMOS transistors.

* * * * *